(12) United States Patent
Udaya (10) Patent No.: US 12,438,869 B2
(45) Date of Patent: Oct. 7, 2025

(54) SYSTEMS AND METHODS FOR AUTHORIZED MOVEMENT OF INFORMATION BETWEEN COMPUTER SYSTEMS

(71) Applicant: SAP SE, Walldorf (DE)

(72) Inventor: Sahana Durgam Udaya, Bangalore (IN)

(73) Assignee: SAP SE, Walldorf (DE)

( * ) Notice: Subject to any disclaimer, the term of this patent is extended or adjusted under 35 U.S.C. 154(b) by 145 days.

(21) Appl. No.: 18/531,384

(22) Filed: Dec. 6, 2023

(65) Prior Publication Data

US 2025/0193172 A1 Jun. 12, 2025

(51) Int. Cl.
*H04L 9/40* (2022.01)

(52) U.S. Cl.
CPC .......... *H04L 63/083* (2013.01); *H04L 63/102* (2013.01); *H04L 63/20* (2013.01)

(58) Field of Classification Search
CPC ..... H04L 63/083; H04L 63/102; H04L 63/20; H04L 63/0281
See application file for complete search history.

(56) References Cited

U.S. PATENT DOCUMENTS

| | | |
|---|---|---|
| 2012/0030167 A1 | 2/2012 | Appiah |
| 2012/0185448 A1 | 7/2012 | Mensch et al. |
| 2013/0139241 A1 | 5/2013 | Leeder |
| 2015/0120649 A1 | 4/2015 | Nakadai |
| 2015/0236907 A1 | 8/2015 | Popli |
| 2018/0081905 A1 | 3/2018 | Kamath et al. |
| 2020/0092177 A1* | 3/2020 | Marvin .................. H04L 69/28 |
| 2020/0118330 A1 | 4/2020 | Connelly et al. |
| 2021/0058447 A1 | 2/2021 | Trufasiu et al. |
| 2021/0168128 A1 | 6/2021 | Carru et al. |
| 2024/0419456 A1* | 12/2024 | Eberlein ............. G06F 9/44526 |

OTHER PUBLICATIONS

Bigstar: "Site to site transfers (FXP)—1-15 INV. Flash FXP Forums", H04L9/40, Apr. 22, 2014 (Apr. 22, 2014), pp. 1-2, XP093246533, The Way back machine Retrieved from the Internet: URL:https://web.archive.org/web/20140718041834/https://www.flashfxp.com/forum/flashf xp/frequently-asked-questions-faq-/14656-site-site-transfers-fxp.html [retrieved on Feb. 4, 2025].

(Continued)

*Primary Examiner* — Sm A Rahman
(74) *Attorney, Agent, or Firm* — Fountainhead Law Group, PC (57) ABSTRACT

Embodiments of the present disclosure include techniques for moving data. In one embodiment, OAuth tokens are used to automate the retrieval of data on remote systems. A frontend application user may select objects to be moved between systems. An OAuth token may be generated by the source server. In some embodiments, the token is passed between content management systems to move data between the content management systems. The OAuth token may be used in an automated background process to retrieve data objects from a source server and send the tokens from a source CMS to a target CMS, where a user may access the data objects.

20 Claims, 5 Drawing Sheets

(56) References Cited

OTHER PUBLICATIONS

Cppcis231: "How to FTP and FXP", 1-15, Mar. 5, 2012 (Mar. 5, 2012), XP093246544, Retrieved from the Internet: URL:https://www.youtube.com/watch?v=6XXQge RWWRw [retrieved on Feb. 4, 2025].
The extended European search report of Application No. 24206608.2 dated Mar. 10, 2025. 6 pages.
EU Search Report dated May 12, 2025 for Corresponding EU Application No. 24210027.9. 13 pages.

\* cited by examiner

SYSTEMS AND METHODS FOR AUTHORIZED MOVEMENT OF INFORMATION BETWEEN COMPUTER SYSTEMS

CROSS REFERENCE TO RELATED APPLICATIONS

This application is related to, and concurrently filed with, U.S. patent application Ser. No. 18/531,289, entitled "SYSTEMS AND METHODS FOR PARALLEL TRANSPORT OF DATA BETWEEN COMPUTER SYSTEMS", naming Sahana Durgam Udaya and Suneel Sristi as inventors, filed on Dec. 6, 2023, the disclosure of which is hereby incorporated herein by reference.

This application is related to, and concurrently filed with, U.S. patent application Ser. No. 18/531,332, entitled "SYSTEMS AND METHODS FOR SCHEDULING PACKAGES TO SYNCHRONIZE CONTENT ACROSS COMPUTER SYSTEMS", naming Sahana Durgam Udaya and Pranav Kumar as inventors, filed on Dec. 6, 2023, the disclosure of which is hereby incorporated herein by reference.

This application is related to, and concurrently filed with, U.S. patent application Ser. No. 18/531,354, entitled "SYSTEMS AND METHODS FOR COPYING DATA BETWEEN COMPUTER SYSTEMS", naming Sahana Durgam Udaya, Soumya Basavaraju, Abhishek Nagendra, Ashokkumar Kandasamy Narayanan, and Mickey Wong as inventors, filed on Dec. 6, 2023, the disclosure of which is hereby incorporated herein by reference.

This application is related to, and concurrently filed with, U.S. patent application Ser. No. 18/531,369, entitled "SYSTEMS AND METHODS FOR STORING AND RETRIEVING PUBLIC DATA", naming Sahana Durgam Udaya as inventor, filed on Dec. 6, 2023, the disclosure of which is hereby incorporated herein by reference.

BACKGROUND

The present disclosure relates generally to software systems, and in particular, to systems and methods for authorized movement of information between computer systems.

Computer systems require data to produce useful and meaningful results. Data preparation and analytics can involve complex, time consuming preparation of relations, visualizations, and compilations of data. When data is prepared in such a way, it may be beneficial to share the data across multiple computer systems. However, moving complex data structures across different systems can be a challenge. One particular challenge is to ensure that only authorized users are able to obtain the data. However, typical authentication procedures, such as vault servers that store authentication information, can be burdensome to maintain as well as present risks of unauthorized access during a data move between systems.

The present disclosure addresses these and other challenges and is directed to techniques for moving data between computer systems.

DETAILED DESCRIPTION

Described herein are techniques for authorized moving of information. In the following description, for purposes of explanation, numerous examples and specific details are set forth in order to provide a thorough understanding of some embodiments. Various embodiments as defined by the claims may include some or all of the features in these examples alone or in combination with other features described below and may further include modifications and equivalents of the features and concepts described herein.

Figure 1:
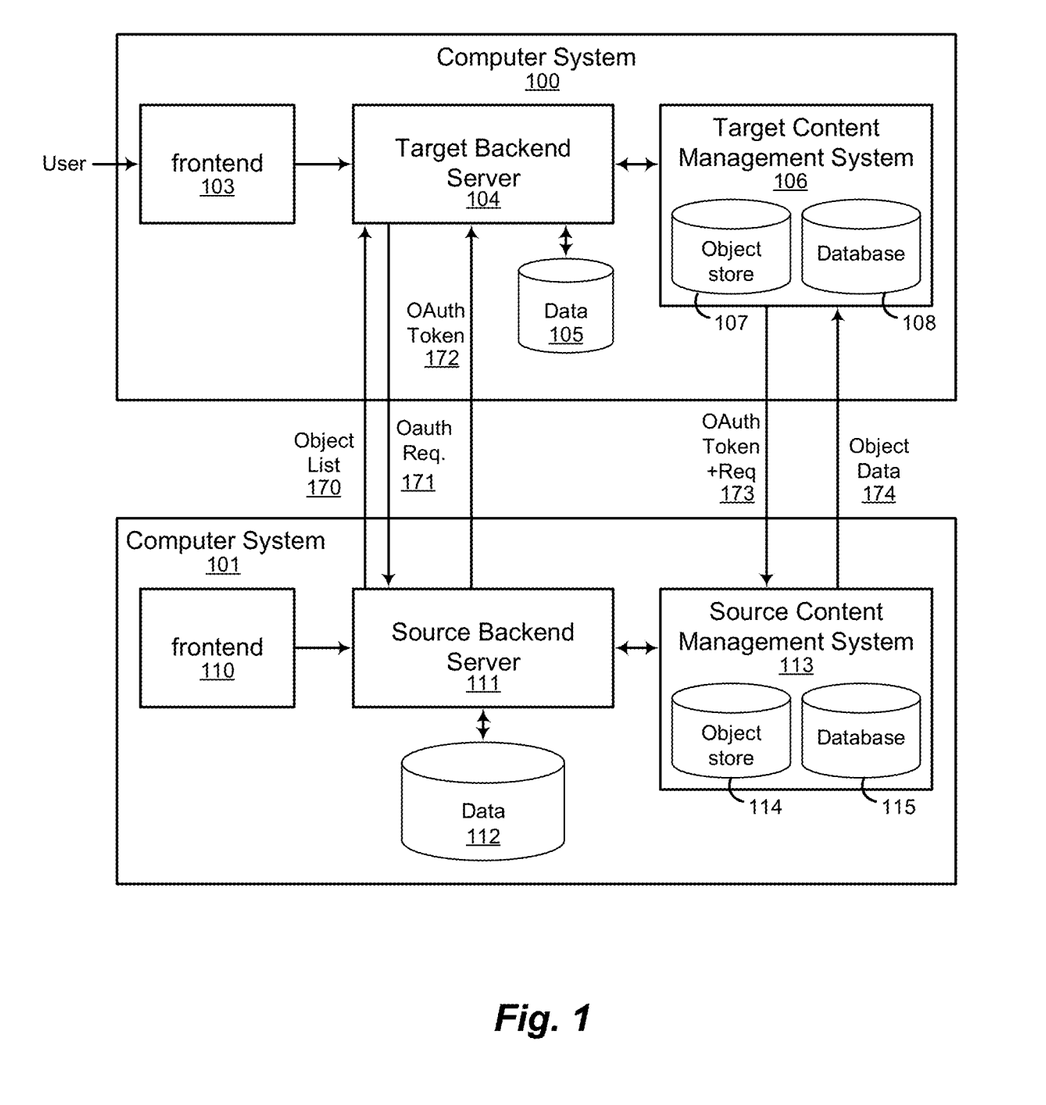
FIG. 1 illustrates a system for moving data according to an embodiment.

FIG. 1 illustrates a system for moving data according to an embodiment. Features and advantages of the present disclosure include techniques for moving data between computer systems. FIG. 1 includes computer systems 100 and 101. Computer system 100 may include a tenant frontend application 103 executing on a computer coupled to a backend server 104. Backend server 104 may execute on one or more other computers and be configured to support multiple users of multiple frontend applications, for example. Backend server 104 may be coupled to database 105, which stores application data for many users. Backend server 104 may be coupled to content management system 106 operating on one or more computers. Content management system 106 may include a database 108 and object datastore 107. Object datastore 107 may store objects, which are data structures holding multiple attributes of data and metadata, for example. Similarly, computer system 101 may include a tenant frontend application 110 executing on a computer coupled to a backend server 111. Backend server 111 may execute on one or more other computers and be configured to support multiple users of multiple frontend applications, for example. Backend server 111 may be coupled to database 112, which stores application data for many users. Backend server 111 may be coupled to content management system 113 operating on one or more computers. Content management system 113 may include a database 115 and object datastore 114 similar to object datastore 107, for example.

A user may desire to move data from content management system (CMS) 113 to content management system (CMS) 106. Accordingly, CMS 113 is referred to as a source CMS, server 111 is referred to as a source backend server, CMS 106 is referred to as a target CMS, and server 104 is referred to as a target backend server. A user may interface with computer systems 100 and 101 through a user interface (UI) in frontend 103. The user may want to access data stored on computer system 101 and may move data from computer system 101 to computer system 100. Accordingly, frontend 103 may receive access information for source backend server 111. Using the access information, frontend 103 may receive a list of objects 170 available for transport on the source backend server 111. The user may select one or more selected objects from the list of objects and send a request 171 from frontend 103 to source backend server 111 for an OAuth token. In response to the request, an OAuth token is received at 172 in the frontend 103. Open Authoriziation (aka OAuth) is an open standard for access delegation, used as a way for internet users to grant websites or applications access to their information on other websites but without giving them the passwords. This mechanism permits users to share information about their accounts with third-party applications or websites, for example. Generally, the OAuth protocol provides a way for resource owners to provide a client (e.g., an application) with secure delegated access to server resources. It specifies a process for resource owners to authorize third-party access to their server resources without providing credentials. Designed specifically to work with Hypertext Transfer Protocol (HTTP), OAuth allows access tokens to be issued to third-party clients by an authorization server, with the approval of the resource owner. The third party then uses the access token to access the protected resources hosted by the resource server.

Here, the OAuth token may be used to provide access to the source backend server, for example. Next, target backend server 104 sends target CMS 106 object identifications (IDs) for the selected objects, access information for target backend server 104, access information for the source backend server 111, and the OAuth token. An automated process may now be started to automatically move the selected data objects from CMS 113 to CMS 106.

An automated process or moving data objects may execute on target CMS 106. For example, for each of the selected objects, target CMS 106 may send, at 173, the OAuth token and a request for data associated with an object to source CMS 113. Source CMS 113 may receive the token and request and retrieve data objects from source backend server 111, which may be stored in database 112, for example using the OAuth token, for example. Source CMS 113 then sends the retrieved data objects to target CMS 106 as illustrated at 174.

The data objects are now available in CMS 106 on computer system 100 for use by the user. The data objects may be sent to server 104 and stored in database 105, for manipulation by a user.

A user of frontend application 110 may move data from CMS 106 to CMS 113 using similar process, for example.

Figure 2:
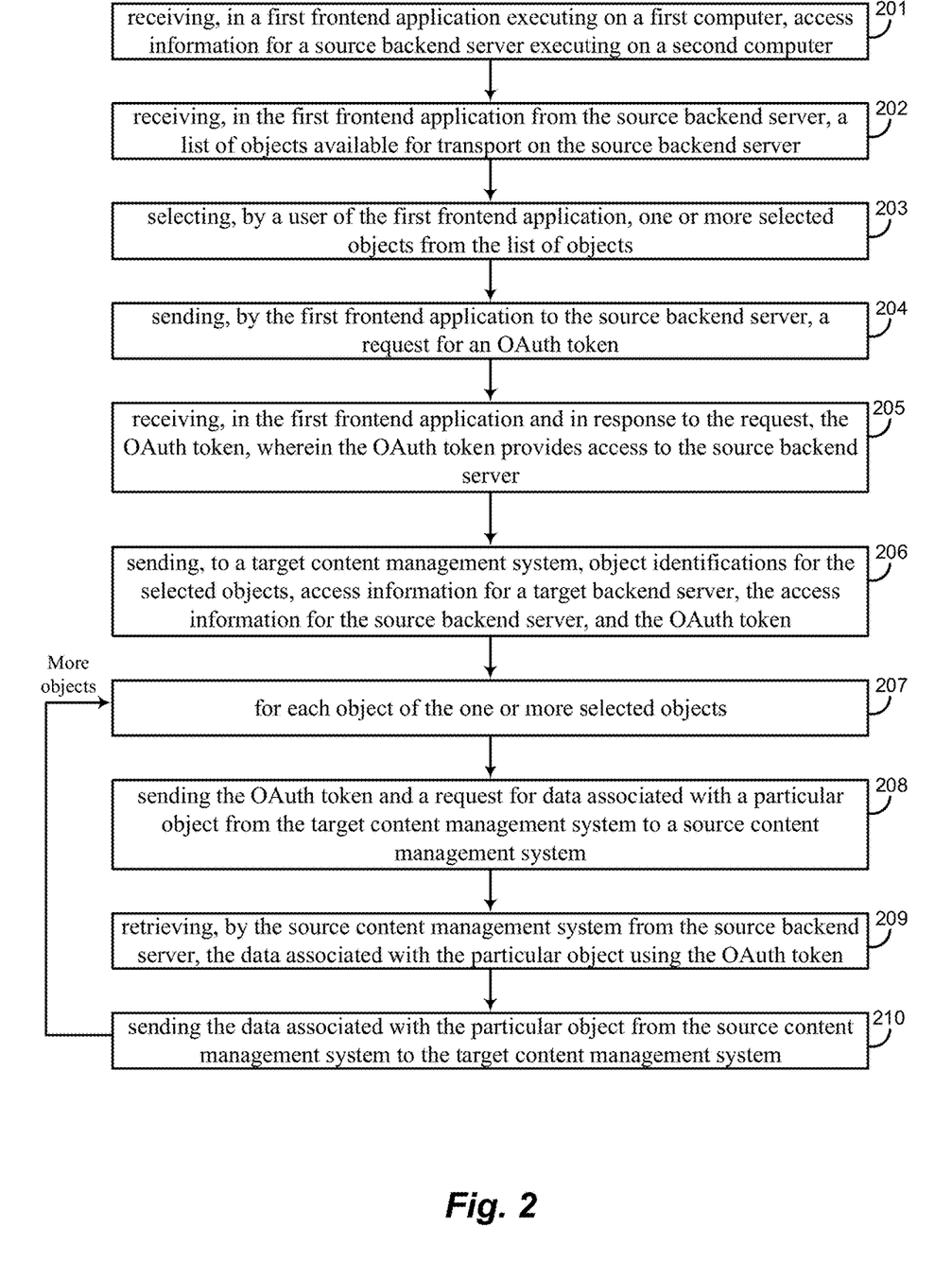
FIG. 2 illustrates a method for moving data according to an embodiment.

FIG. 2 illustrates a method for moving data according to an embodiment. At 201, access information for a source backend server is received in a first frontend application. At 202, a list of objects available for transport on the source backend server is received in the first frontend application from the source backend server. At 203, a user of the first frontend application selects objects from the list of objects. At 204, the first frontend application sends a request for an OAuth token to the source backend server. At 205, the first frontend application receives, in response to the request, the OAuth token, which provides access to the source backend server. At 206, object IDs for the selected objects, access information for a target backend server, the access information for the source backend server, and the OAuth token are sent to a target content management system. Target content management system may then start an automated background process to move the data at 207, where, for each object of the one or more selected objects, the following steps are performed. At 208, the OAuth token and a request for data associated with a particular object are sent from the target content management system to a source content management system. This may include sending object IDs for the data objects to be moved, for example. At 209, the source content management system retrieves the data associated with the particular object using the OAuth token from the source backend server. At 210, the data associated with the particular object is sent from the source content management system to the target content management system. Additional objects may be similarly processed by returning to 207 and repeating steps 208-210.

Figure 3:
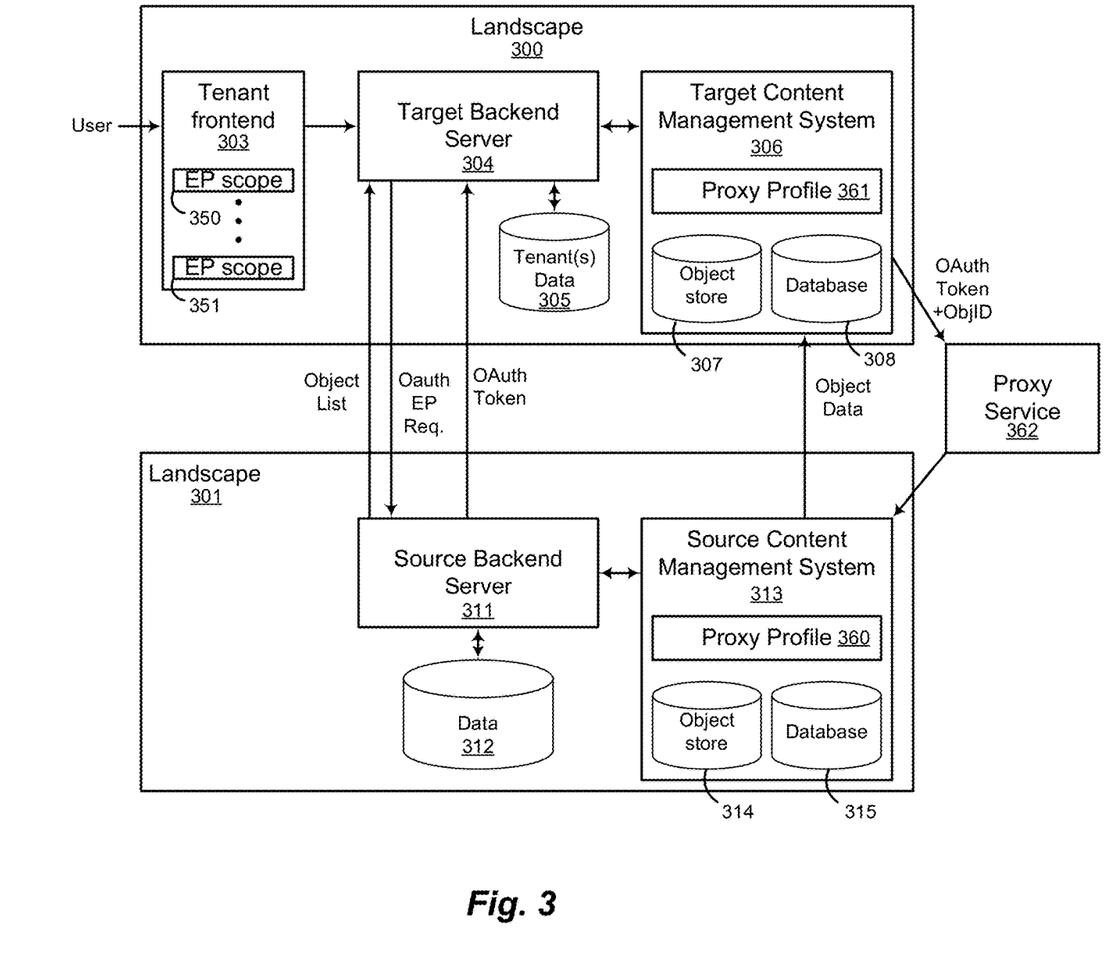
FIG. 3 illustrates example source and target content management systems according to another embodiment.

FIG. 3 illustrates example source and target content management systems according to another embodiment. The following examples illustrate an application of the present disclosure to a multi-tenant system. Traditionally authentication works between target and source CMS is as follows. A target CMS makes call to vault server to get source CMS secrets like JSON Web Token (JWT) credentials. The target CMS handshakes to source CMS with provided secrets. Next a request for objects is sent from source CMS. However, the traditional approach has certain challenges. For a target CMS to communicate with a source CMS, it needs to authenticate using secrets like JWT, credentials, etc. A vault service can be used to store anything the service wants and may not be limited to JWT, credentials, configuration parameters etc. Each service is allocated a path like "x/y/cms/secrets" where they can store needed secrets. But it is each service's responsibility to store, renew/update, delete secrets as needed. Therefore, secrets need to be monitored and renewed by services to ensure expired secrets don't cause workflows to fail. Hence, a CMS service needs to apply a mechanism to monitor and renew secrets, like a scheduler which runs every 'n' interval to check and renew secrets. This means the CMS service is tightly coupled to vault service. From security perspective, a secret will used for 'n' workflows before being renewed/updated, putting the application at risk in case secrets are compromised.

Features and advantages of the present disclosure include using OAuth generated tokens, which result in zero dependency with a vault service and continues to support cross CMS communication. OAuth may be used to grant users access to requested resources (here tenant objects like story, model etc). In this example, a user uses tenant frontend 303 to access source backend server 311 by, for example, entering a source server URL and logging in to the source server. The user may receive a list of objects available on the source backend server for example. The list of objects may correspond to complex analytics content (e.g., models, stories, visualizations, etc. of data) that may be used to discover the unseen data patterns to boost the business productivity, for example.

In this example, a source content management system 313 and a source backend server 311 are in a first landscape 301 and the target content management system 306 and the target backend server 304 are in a second landscape 300. The first landscape 301 may be in a first geographic region and the second landscape 300 may be in a second geographic region, for example. In some embodiments, the first landscape 301 is in a first cloud computer system and the second landscape 300 is in a second cloud computer system, for example. Source content management system 313 may include a database 315 and object datastore 314. Similarly, target content management system 306 may include a database 308 and object datastore 307.

Additionally, as mentioned above, this example is for a multi-tenant system. Accordingly, a user of the first frontend application (aka the tenant frontend) 303 has access to one tenant of a plurality of tenants operating on the first frontend application 303, the source backend server 311, and the target backend server 304, and the list of objects available are only available to the one tenant of the plurality of tenants.

The process starts by frontend 303 receiving access information for a source backend server 311. The access information may comprise the source backend URL and login information (if needed). Once logged in, frontend 303 receives a list of data objects available for transport from the source backend server. The user may then select objects from the list of objects. Frontend 303 then sends a request for an OAuth token to the source backend server 311. In some embodiments, the request for an OAuth token is sent to the source backend server 311 using an endpoint request to access one or more particular resources on the source backend server. The endpoint request may comprise a URL and a body. The endpoint request may limit the scope of the OAuth token generated. For example, the endpoint request may limit the scope of the OAuth token to accessing objects in the source content management system. In some embodiments, the user selects one of a plurality of predefined scope values 350-351 corresponding to content management systems in a user interface of the frontend 303. A "CMS" scope may specify that the OAuth token only allows CMS access, for example, thereby limiting unauthorized uses of the token to access other resources in the system. The OAuth token received in response to the request provides access to the source backend server 311 limited in scope to only allow CMS access. Next, object IDs for the data objects, access information for a target backend server 304, the access information for the source backend server 311, and the OAuth token are sent to target CMS 306. An automated background process may then be started for moving the data objects between CMS systems.

For example, for each object of the one or more selected data objects, the process may send the OAuth token and a request for data associated with a particular object from the target content management system to a source content management system. In some embodiments, a proxy service 362 may be used. For example, the OAuth token and the request for data associated with the particular object may be sent to proxy service 362. Proxy service 362 processes the OAuth token and interfaces with the source CMS 313 to hide program interfaces of the source CMS, for example.

Next, source CMS 313 may retrieve the data objects from server 311, which may be stored in database 312, for example using the OAuth token. In this example, a proxy profile 360 may be used to retrieve data objects from the server 311. A proxy profile 360 may be created on the source CMS 313. Proxy profile 360 is populated with profile information of the user. Source CMS 313 associates proxy profile 360 with the retrieval of the data objects by the source CMS 313 from the source backend server 311. The system can thereby audit who was performing the data move. The data objects are then sent from the source CMS 313 to the target CMS 306.

The data objects may then be stored in the target backend server 304. In this example another proxy profile 361 is created on the target CMS 306. Proxy profile 361 is populated using profile information of the user. The target CMS 306 associates proxy profile 361 with the process of storing the data objects in a target backend server 304, which may be stored in database 305, for example.

Figure 4:
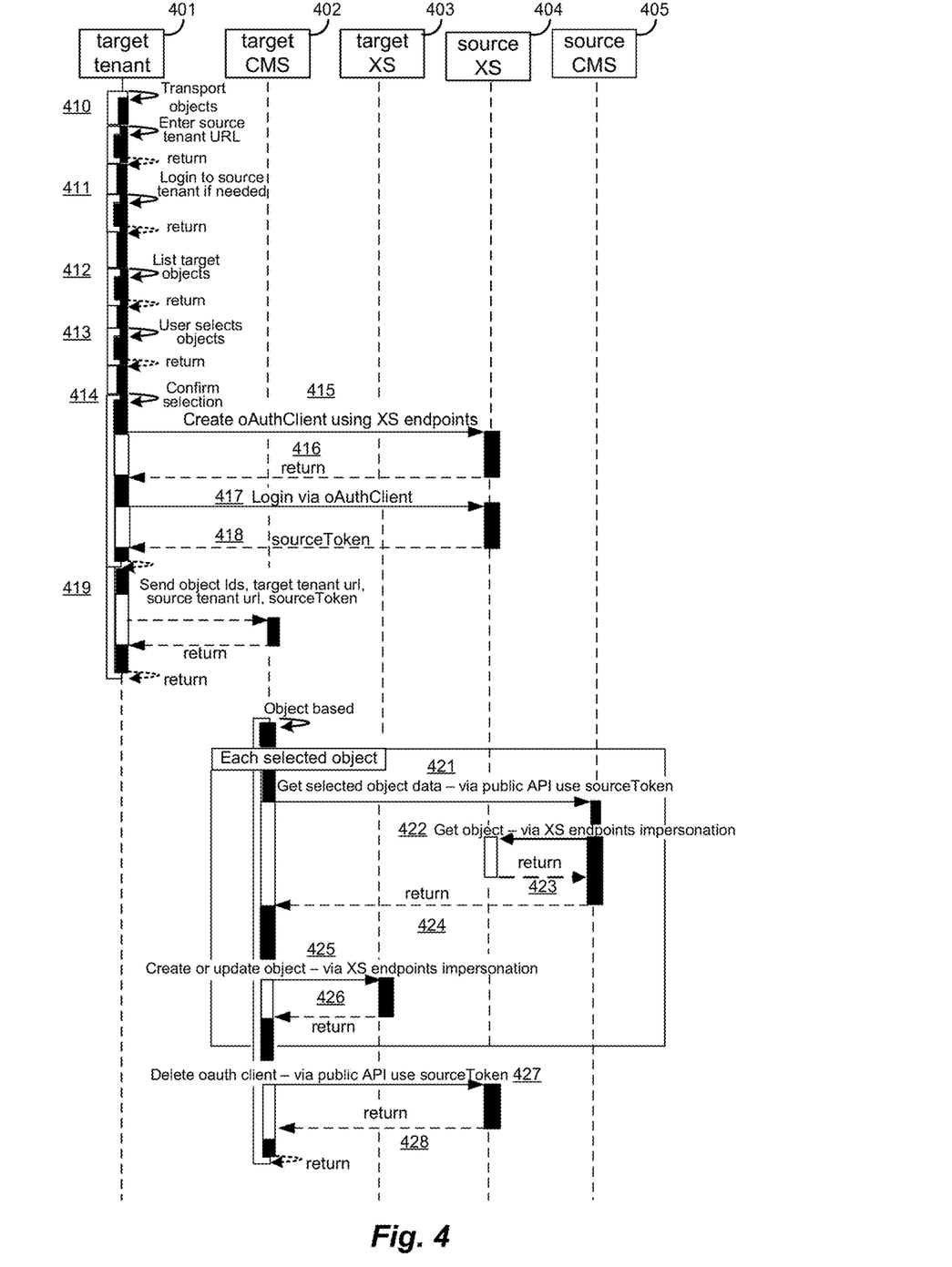
FIG. 4 illustrates an example flow diagram for moving objects between source and target content management systems according to another embodiment.

FIG. 4 illustrates an example flow diagram for moving objects between source and target content management systems according to an embodiment. At 410, target tenant frontend receives (e.g., from a user entry) a source tenant server (source XS) URL. At 411, the source tenant is logged into. At 412, a list of objects is presented to a user. At 413, the user selects objects to be moved. At 414, the user confirms the selection. At 415, an OAuth client is created and the source XS server 404 is accessed using endpoints. An OAuth client may be created through a UI on a frontend, for example. An OAuth client is a software resource entity containing details of who can access what resources from server. Typically, an OAuth client contains a unique identifier for the OAuth client, a list of resources, and lifetime of generated tokens, for example. At 416, control returns to the target tenant frontend. At 417, the user logs in to the source XS 404 using the OAuth client.

OAuth client returns an OAuth token to access the source XS 404 at 418. At 419, the object IDs, target tenant server URL, source tenant server URL, and token are sent to target CMS 402 and the automated process begins.

For the automated process of this example, target CMS 402 gets selected object data using public APIs using the token at 421. As mentioned above, a proxy service may be used to hide the interface of source CMS 405. Source CMS 405 gets objects from source XS server 404 using source XS endpoints at 422, which may be impersonate the user's profile using proxy profiles as mentioned above. At 423 objects are returned to the source CMS 405. At 424, objects are sent from source CMS 405 to target CMS 402. At 425, objects are created or updated in target XS server 403 using XS endpoints. Impersonation of the user's profile may be performed using proxy profile as described above. At 426, control returns to the target CMS 402. At 427, the OAuth client is deleted from source XS 404, for example, using a public API. The process stops on target CMS 402 at 428.

Figure 5:
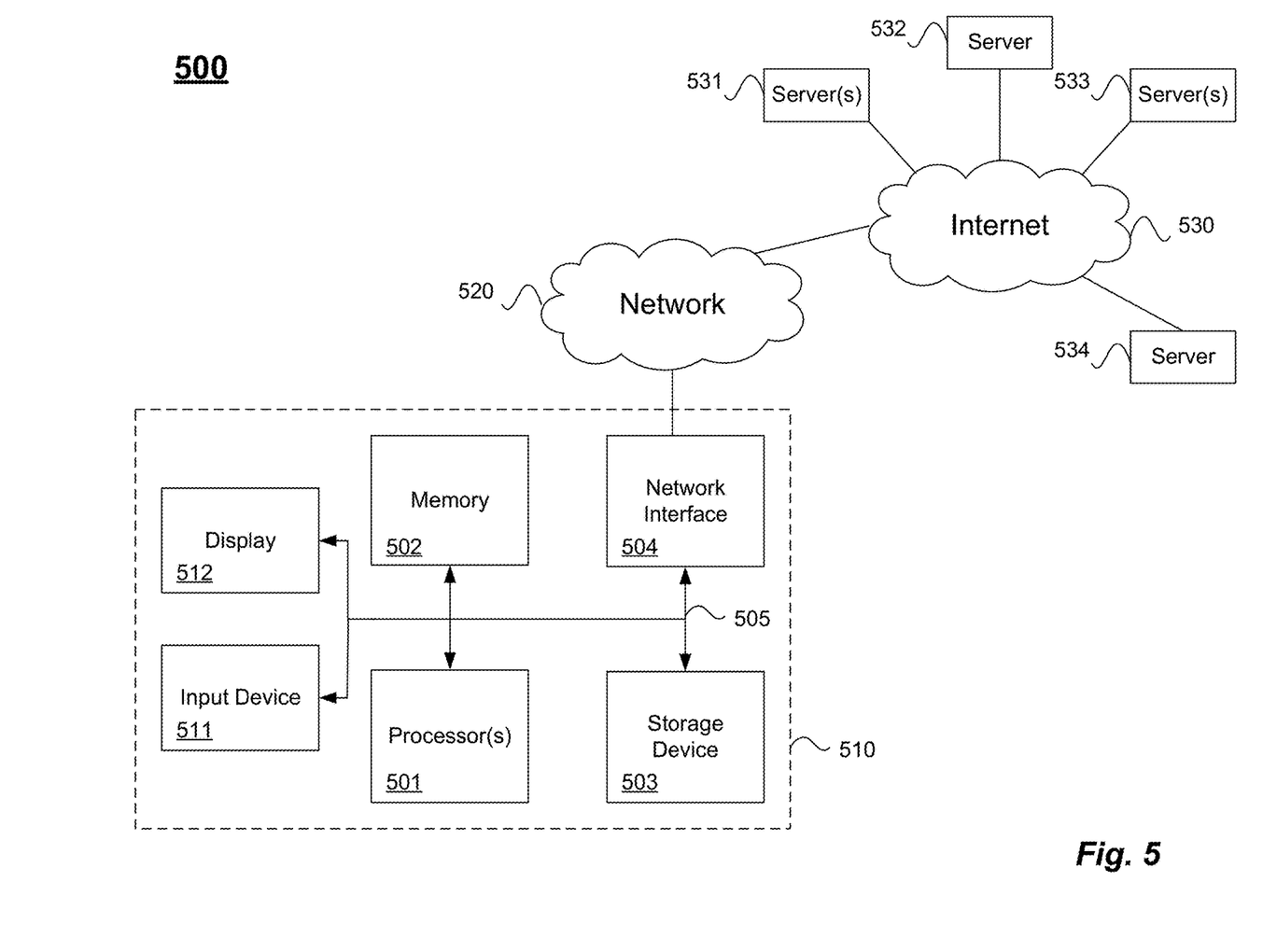
FIG. 5 illustrates hardware of a special purpose computing system configured according to the above disclosure.

FIG. 5 illustrates hardware of a special purpose computing system 500 configured according to the above disclosure. The following hardware description is merely one example. It is to be understood that a variety of computers topologies may be used to implement the above-described techniques. An example computer system 510 is illustrated in FIG. 5. Computer system 510 includes a bus 505 or other communication mechanism for communicating information, and one or more processor(s) 501 coupled with bus 505 for processing information. Computer system 510 also includes memory 502 coupled to bus 505 for storing information and instructions to be executed by processor 501, including information and instructions for performing some of the techniques described above, for example. Memory 502 may also be used for storing programs executed by processor(s) 501. Possible implementations of memory 502 may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, solid state disk, a flash or other non-volatile memory, a USB memory card, or any other electronic storage medium from which a computer can read. Storage device 503 may include source code, binary code, or software files for performing the techniques above, for example. Storage device 503 and memory 502 are both examples of non-transitory computer readable storage mediums (aka, storage media).

In some systems, computer system 510 may be coupled via bus 505 to a display 512 for displaying information to a computer user. An input device 511 such as a keyboard, touchscreen, and/or mouse is coupled to bus 505 for communicating information and command selections from the user to processor 501. The combination of these components allows the user to communicate with the system. In some systems, bus 505 represents multiple specialized buses for coupling various components of the computer together, for example.

Computer system 510 also includes a network interface 504 coupled with bus 505. Network interface 504 may provide two-way data communication between computer system 510 and a local network 520. Network 520 may represent one or multiple networking technologies, such as Ethernet, local wireless networks (e.g., WiFi), or cellular networks, for example. The network interface 504 may be a wireless or wired connection, for example. Computer system 510 can send and receive information through the network interface 504 across a wired or wireless local area network, an Intranet, or a cellular network to the Internet 530, for example. In some embodiments, a frontend (e.g., a browser), for example, may access data and features on backend software systems that may reside on multiple different hardware servers on-prem 531 or across the network 530 (e.g., an Extranet or the Internet) on servers 532-534. One or more of servers 532-534 may also reside in a cloud computing environment, for example.

FURTHER EXAMPLES

Each of the following non-limiting features in the following examples may stand on its own or may be combined in various permutations or combinations with one or more of the other features in the examples below. In various embodiments, the present disclosure may be implemented as a system, method, or computer readable medium.

Embodiments of the present disclosure may include systems, methods, or computer readable media. In one embodiment, the present disclosure includes computer system comprising: at least one processor and at least one non-transitory computer readable medium (e.g., memory) storing computer executable instructions that, when executed by the at least one processor, cause the computer system to perform a method as described herein and in the following examples. In another embodiment, the present disclosure includes a non-transitory computer-readable medium storing computer-executable instructions that, when executed by at least one processor, perform a method as described herein and in the following examples.

In some embodiments, the present disclosure includes a method of moving data comprising: receiving, in a first frontend application executing on a first computer, access information for a source backend server executing on a second computer; receiving, in the first frontend application from the source backend server, a list of objects available for transport on the source backend server; receiving a selection, from a user interface of the first frontend application, of one or more selected objects from the list of objects; sending, by the first frontend application to the source backend server, a request for an OAuth token; receiving, in the first frontend application and in response to the request, the OAuth token, wherein the OAuth token provides access to the source backend server; sending, to a target content management system, object identifications for the selected objects, access information for a target backend server, the access information for the source backend server, and the OAuth token; and for each object of the one or more selected objects: sending the OAuth token and a request for data associated with a particular object from the target content management system to a source content management system; retrieving, by the source content management system from the source backend server, the data associated with the particular object using the OAuth token; and sending the data associated with the particular object from the source content management system to the target content management system.

In some embodiments, the source content management system and the source backend server are in a first landscape and the target content management system and the target backend server are in a second landscape.

In some embodiments, the first landscape is in a first geographic region and the second landscape is in a second geographic region.

In some embodiments, the first landscape is in a cloud computer system and the second landscape is in a second cloud computer system.

In some embodiments, the user interface of the first frontend application has access to one tenant of a plurality of tenants operating on the first frontend application, the source backend server, and the target backend server, and the list of objects available are only available to the one tenant of the plurality of tenants.

In some embodiments, the request for an OAuth token is sent to the source backend server using an endpoint request to access one or more particular resources on the source backend server.

In some embodiments, the endpoint request comprises a URL and a body.

In some embodiments, the endpoint request limits a scope of the OAuth token.

In some embodiments, the endpoint request limits the scope of the OAuth token to accessing objects in the source content management system.

In some embodiments, one of a plurality of predefined scope values corresponding to content management systems is selected in a user interface of the first frontend.

In some embodiments, the method includes, for each object, sending the OAuth token and the request for data associated with the particular object to the source content management system further comprises sending the OAuth token and the request for data associated with the particular object to a proxy service, the proxy service processing the OAuth token and interfacing with the source content management system to hide program interfaces of the source content management system.

In some embodiments, the method includes, for each object, sending the OAuth token and the request for data associated with the particular object to the source content management system comprises sending one or more object identifications.

In some embodiments, the method includes, for each object, the method further comprising: creating a first proxy profile on the source content management system; populating the first proxy profile using profile information of the user, wherein the source content management system associates the first proxy profile with said step of retrieving, by the source content management system from the source backend server, the data associated with the particular object using the OAuth token.

In some embodiments, the method includes, for each object, the method further comprising: creating a second proxy profile on the target content management system; populating the second proxy profile using profile information of the user; and after said step of sending the data associated with the particular object from the source content management system to the target content management system, storing the data associated with the particular object in a target backend server, wherein the target content management system associates the second proxy profile with said step of storing the data associated with the particular object in a target backend server.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims.

Based on the above disclosure and the following claims, other arrangements, embodiments, implementations, and equivalents may be employed without departing from the scope hereof as defined by the claims.

What is claimed is:

1. A method of moving data comprising:
   receiving, in a first frontend application executing on a first computer, access information for a source backend server executing on a second computer;
   receiving, in the first frontend application from the source backend server, a list of objects available for transport on the source backend server;
   receiving a selection, from a user interface of the first frontend application, of one or more selected objects from the list of objects;
   sending, by the first frontend application to the source backend server, a request for an OAuth token;
   receiving, in the first frontend application and in response to the request, the OAuth token, wherein the OAuth token provides access to the source backend server;
   sending, to a target content management system, object identifications for the selected objects, access information for a target backend server, the access information for the source backend server, and the OAuth token; and
   for each object of the one or more selected objects:
      sending the OAuth token and a request for data associated with a particular object from the target content management system to a source content management system;
      retrieving, by the source content management system from the source backend server, the data associated with the particular object using the OAuth token; and
      sending the data associated with the particular object from the source content management system to the target content management system.

2. The method of claim 1, wherein the source content management system and the source backend server are in a first landscape and the target content management system and the target backend server are in a second landscape.

3. The method of claim 2, wherein the first landscape is in a first geographic region and the second landscape is in a second geographic region.

4. The method of claim 2, wherein the first landscape is in a cloud computer system and the second landscape is in a second cloud computer system.

5. The method of claim 1, wherein the user interface of the first frontend application has access to one tenant of a plurality of tenants operating on the first frontend application, the source backend server, and the target backend server, and the list of objects available are only available to the one tenant of the plurality of tenants.

6. The method of claim 1, wherein the request for an OAuth token is sent to the source backend server using an endpoint request to access one or more particular resources on the source backend server.

7. The method of claim 6, wherein the endpoint request comprises a URL and a body.

8. The method of claim 6, wherein the endpoint request limits a scope of the OAuth token.

9. The method of claim 8, wherein the endpoint request limits the scope of the OAuth token to accessing objects in the source content management system.

10. The method of claim 9, wherein one of a plurality of predefined scope values corresponding to content management systems is selected in a user interface of the first frontend.

11. The method of claim 1, wherein, for each object, sending the OAuth token and the request for data associated with the particular object to the source content management system further comprises sending the OAuth token and the request for data associated with the particular object to a proxy service, the proxy service processing the OAuth token and interfacing with the source content management system to hide program interfaces of the source content management system.

12. The method of claim 1, wherein, for each object, sending the OAuth token and the request for data associated with the particular object to the source content management system comprises sending one or more object identifications.

13. The method of claim 1, wherein, for each object, the method further comprising:
   creating a first proxy profile on the source content management system;
   populating the first proxy profile using profile information of the user,
   wherein the source content management system associates the first proxy profile with said step of retrieving, by the source content management system from the source backend server, the data associated with the particular object using the OAuth token.

14. The method of claim 13, wherein, for each object, the method further comprising:
   creating a second proxy profile on the target content management system;
   populating the second proxy profile using profile information of the user; and
   after said step of sending the data associated with the particular object from the source content management system to the target content management system, storing the data associated with the particular object in a target backend server,
   wherein the target content management system associates the second proxy profile with said step of storing the data associated with the particular object in a target backend server.

15. A computer system comprising:
   at least one processor;
   at least one non-transitory computer readable medium storing computer executable instructions that, when executed by the at least one processor, cause the computer system to perform a method of moving data comprising:
   receiving, in a first frontend application executing on a first computer, access information for a source backend server executing on a second computer;
   receiving, in the first frontend application from the source backend server, a list of objects available for transport on the source backend server;
   receiving a selection, from a user interface of the first frontend application, of one or more selected objects from the list of objects;
   sending, by the first frontend application to the source backend server, a request for an OAuth token;
   receiving, in the first frontend application and in response to the request, the OAuth token, wherein the OAuth token provides access to the source backend server;
   sending, to a target content management system, object identifications for the selected objects, access information for a target backend server, the access information for the source backend server, and the OAuth token; and
   for each object of the one or more selected objects:

sending the OAuth token and a request for data associated with a particular object from the target content management system to a source content management system;

retrieving, by the source content management system from the source backend server, the data associated with the particular object using the OAuth token; and sending the data associated with the particular object from the source content management system to the target content management system.

16. The computer system of claim 15, wherein the user interface of the first frontend application has access to one tenant of a plurality of tenants operating on the first frontend application, the source backend server, and the target backend server, and the list of objects available are only available to the one tenant of the plurality of tenants.

17. The computer system of claim 15, wherein the request for an OAuth token is sent to the source backend server using an endpoint request to access one or more particular resources on the source backend server.

18. A non-transitory computer-readable medium storing computer-executable instructions that, when executed by at least one processor, perform a method of moving data, the method comprising:

receiving, in a first frontend application executing on a first computer, access information for a source backend server executing on a second computer;

receiving, in the first frontend application from the source backend server, a list of objects available for transport on the source backend server;

receiving a selection, from a user interface of the first frontend application, of one or more selected objects from the list of objects;

sending, by the first frontend application to the source backend server, a request for an OAuth token;

receiving, in the first frontend application and in response to the request, the OAuth token, wherein the OAuth token provides access to the source backend server;

sending, to a target content management system, object identifications for the selected objects, access information for a target backend server, the access information for the source backend server, and the OAuth token; and for each object of the one or more selected objects:
sending the OAuth token and a request for data associated with a particular object from the target content management system to a source content management system;

retrieving, by the source content management system from the source backend server, the data associated with the particular object using the OAuth token; and sending the data associated with the particular object from the source content management system to the target content management system.

19. The non-transitory computer-readable medium of claim 18, wherein the user interface of the first frontend application has access to one tenant of a plurality of tenants operating on the first frontend application, the source backend server, and the target backend server, and the list of objects available are only available to the one tenant of the plurality of tenants.

20. The non-transitory computer-readable medium of claim 18, wherein the request for an OAuth token is sent to the source backend server using an endpoint request to access one or more particular resources on the source backend server.

* * * * *